United States Patent
Botnick

[15] 3,658,094
[45] Apr. 25, 1972

[54] PUSH-BUTTON MIXING VALVE
[72] Inventor: Irlin Botnick, 3155 Kersdale Road, Pepper Pike, Ohio 44124
[22] Filed: Dec. 9, 1968
[21] Appl. No.: 782,798

[52] U.S. Cl. ...................................................137/636.1
[51] Int. Cl. ..........................................................F16k 11/10
[58] Field of Search ..............137/625.4, 625, 625.17, 636.1, 137/636.4, 607; 251/251, 257, 259

[56] References Cited

UNITED STATES PATENTS

| | | | |
|---|---|---|---|
| 3,537,479 | 11/1970 | Nelson | 137/636.4 |
| 2,593,740 | 4/1952 | Faust | 251/357 |
| 2,820,478 | 1/1958 | Hendry | 137/607 |
| 2,923,315 | 2/1960 | Bletcher et al. | 137/607 X |
| 3,173,444 | 3/1965 | Bucknell et al. | 137/636.4 X |
| 3,207,183 | 9/1965 | Stuhl | 251/251 X |
| 3,468,344 | 9/1969 | Sanford | 137/607 X |
| 2,893,425 | 7/1959 | Rimsha et al. | 137/607 |

FOREIGN PATENTS OR APPLICATIONS

| | | | |
|---|---|---|---|
| 583,104 | 10/1958 | Italy | 137/636.1 |

Primary Examiner—Henry T. Klinksiek
Attorney—Ely, Golrick & Flynn

[57] ABSTRACT

A push-button multi-temperature selection valve, having at least two parallel chambers bores and hot and cold water supply connections communicating variously through radial ports with the chambers, has valve members for the respective ports radially slidable in support sleeve structures, each inserted end wise as a sub-assembly in a bore; and within each bore at least one coaxially stemmed either rotary or sliding camming type valve operator. Two operators, selecting flow solely from respective inlets, and at least one selecting mixing flow from both inlets are actuated by respective push-button mechanisms.

14 Claims, 13 Drawing Figures

INVENTOR.
IRLIN BOTNICK
BY
*Elynd Golrick*
ATTORNEYS

PUSH-BUTTON MIXING VALVE

It is the general object of the invention to provide a multi-temperature selecting push-button mixing valve of durable, relatively simple and low cost construction which though obviously having other applications is particularly adapted for residential use, for example on kitchen sinks, lavatories and bath tubs.

Another object is the provision of such a valve adapted for use of simple easily removable decorative casing rendering the valve unit readily accessible e.g., from the above a sink, for all operations of adjustment and maintenance servicing, such as setting elements establishing two temperatures intermediate between the supplied cold and hot water temperatures, shutting off the supply of water, cleaning the supply inlet filters, and also inspection or change or valve elements. Another object is the provision of such a valve for which a screw driver will be the only required servicing tool.

The aforegoing abstract outlines a particular aspect of the invention conductive to the attainment of the above advantageous objects. Further in various embodiments, valve supporting and operating assemblies are easily removed for inspection and repair by simple removal of end screws, with manual snap-in, snap-out manipulations being all that is entailed for replacement of individual valving elements in the assemblies and of valve sealing heads or elements on the individual valve members.

In the embodiments shown, a principal valve body casting requires a minimum of precision machining operations in consequence of the overall design while a majority of the other components may be readily fabricated at low cost by plastic molding techniques.

It is to be observed that certain sub-combinations of the overall valve herein disclosed apparently represent areas of novelty and advantageous construction useful as well for other applications and environments, possible with other materials, namely the manner of operating individual valves for control of a respective port, and also sub-combinations useful, for example, for providing from supply lines of different water temperatures a discharge at the supply temperature of one and a second discharge at a selectably pre-set intermediate temperature.

Other objects and advantages will appear from the following description and the drawings wherein.

Figure 1:
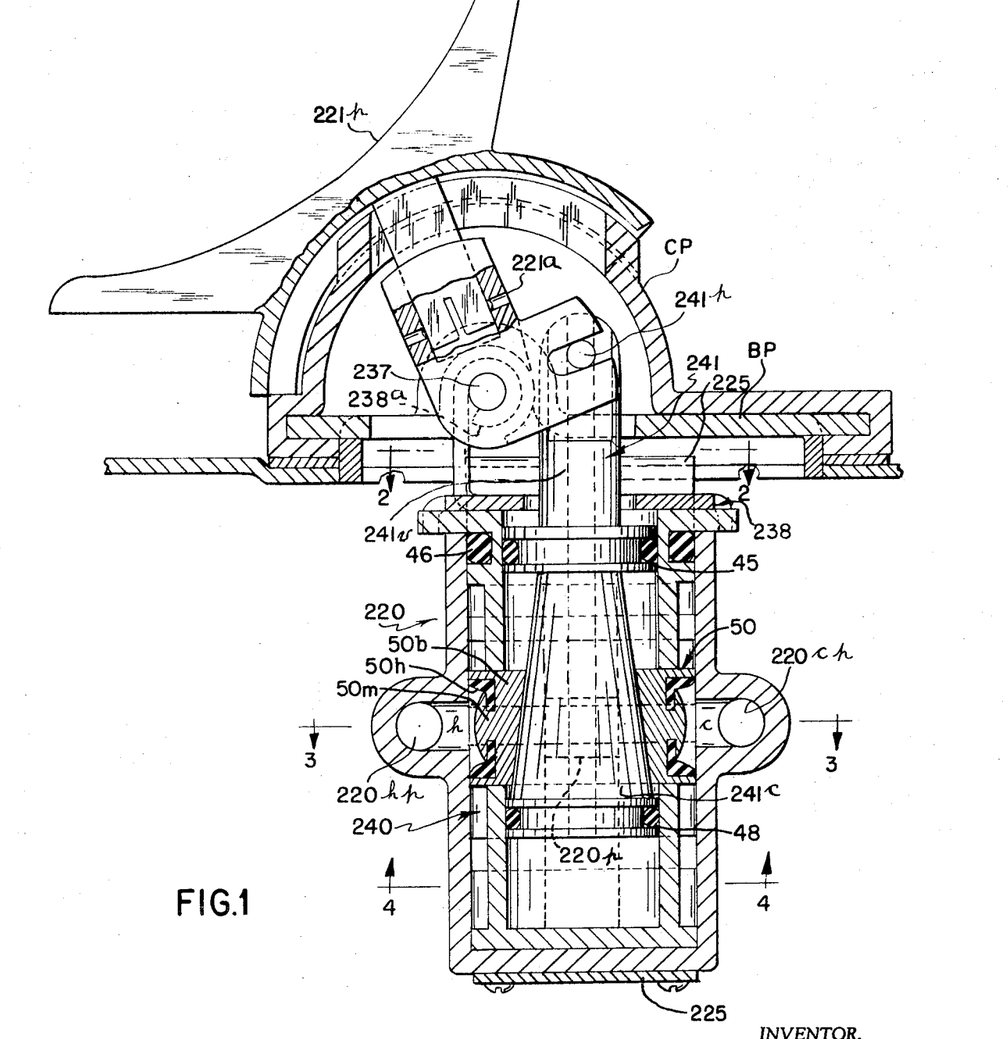
FIG. 1 is a vertical section through an embodiment of the invention utilizing axially sliding valve operators taken substantially at the location of line 1—1 in FIG. 2.

In FIGS. 1–5, axially reciprocating or slidable camming operators are used permitting a side-by-side parallel disposition of push-buttons having a pin-and-slot connection to the operator stems, four parallel side-by-side vertical barrels or bores with coplanar axes being provided by the body casting 220. The general operator and linkage arrangements, also the valving members and support frame sleeves for each bore are shown by FIG. 1, with the body porting passageway arrangement shown in the horizontal and longitudinal sections of FIGS. 3 and 4.

Figures 1A, 3:
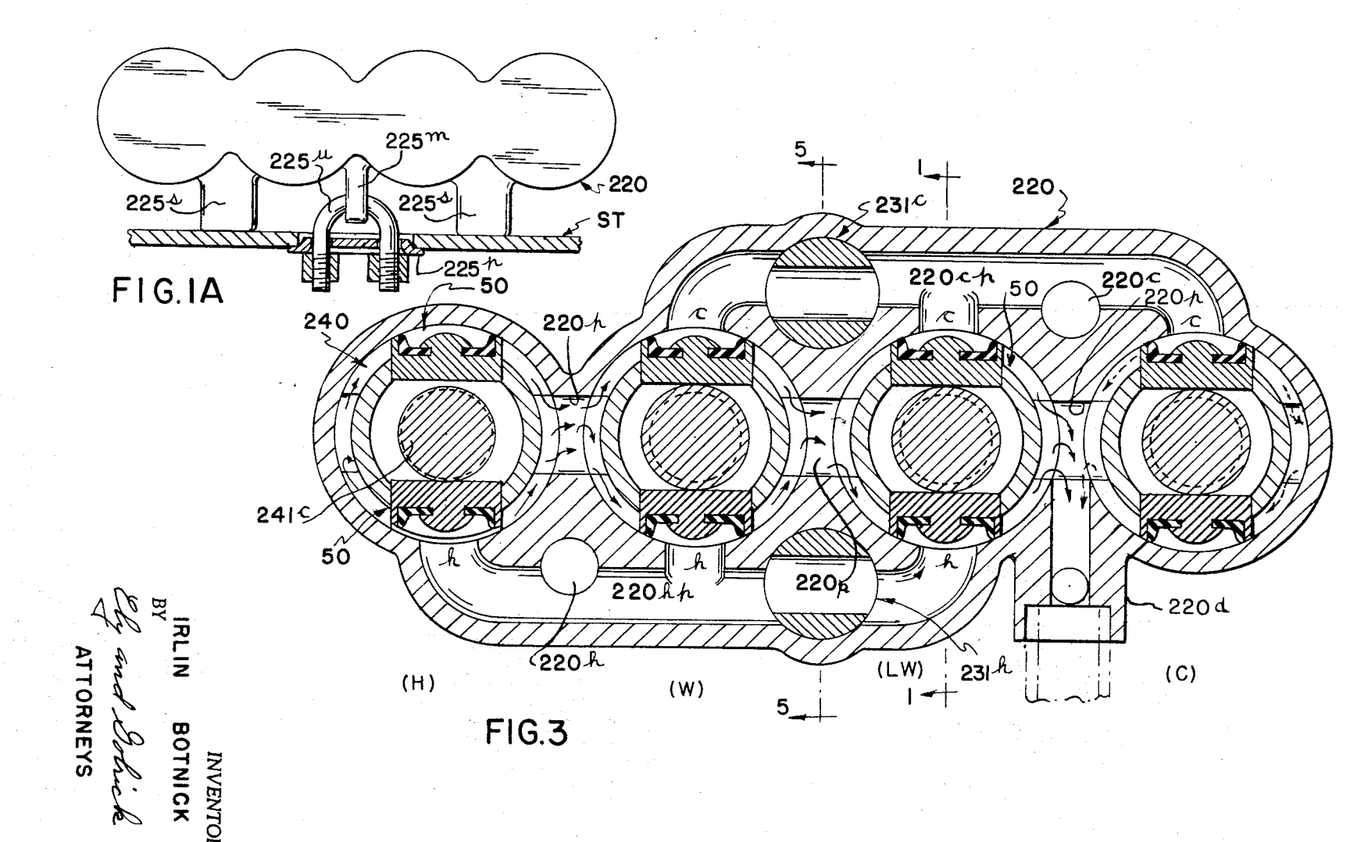
FIG. 1A outlines a modification of the FIG. 1 mounting.
FIGS. 3 and 4 are horizontal sections taken at the lines 3—3 and 4—4 in FIG. 1.

As seen in FIG. 3, radial passageways 220p through the center regions of the intervening or common wall portions of the successive barrels put the bores successively in constant communication with each other and thus with the discharge connection formation 220d opening into the passage 220p between the last ("cold" selection) and second last ("luke-warm" selection) bores at the right end.

Hot and cold water supply or inlet connection formations 220h and 220c, like 220d here shown adapted for brazed or soldered attachment of piping, open upwardly into respective lateral passages 220hp, 220cp on opposite sides of the casting, (see FIG. 3); the cold water passage branching as inlet passages opening through respective radial ports c into the "cold" selection barrel bore at the right end, and into the right and left intermediate, "luke-warm" and "warm," selection barrel bores in the middle; the hot lateral passage 220hp branching as inlet passages opening through the radial ports h into the hot selection barrel bore at the left end and also into the two intermediate bores diametrically opposite the radial inlet ports c; all these ports being all at the same level or axial location in the bores.

At a transverse center plane, simple plug valve type flow metering devices for pre-setting the intermediate temperatures "warm" and "luke-warm" are formed by cylindrical plugs 231c and 231h respectively, rotationally disposed and O-ring sealed in upwardly opening vertical bores intersecting the lateral cold and hot water passages 220cp and 220hp (see FIGS. 5 and 3); the plugs being retained in the vertical bores by the hereinafter-described push-button shaft supporting plate 238, through which their respective end-slotted setting stems extend upwardly; the plate 238 being secured to the casting by four screws 238s.

FIG. 1 shows the structure and components at each bore barrel, excepting that only one controlled port is present in the end barrels. The inserted valving member supporting sleeve or cup-like liner 240, at its upper end is generally circularly flanged to overlie the casting or barrel wall end, but the flange having diametric end lugs 240e engaged between downwardly struck lugs of plate 238, and also parallel flats engaging abutting like flats of adjacent barrel sleeve flanges, to maintain sleeve orientation relative to bore ports. Lugs 240e also afford finger purchase to rotate or remove the sleeve from the bore.

Beneath the flange the sleeve is circumferentially grooved at 46 for an O-ring sealing to the bore; and has diametric "windows" or slideways supporting valving members 50 for cooperation with the respective diametrically opposed radial hot and cold water inlet ports h and c for the middle barrels; one valve member in the "hot" and "cold" barrels, of course, controlling no port but ensuring symmetrical balance of operating forces on the structures. In each member 50, the back face is sloped complementary to the cooperating sloping cam surface on the cam enlargement 241c of the axially sliding operator plunger or piston 241; the camming surface being either the slope of the conical enlargement as here shown, or a respective one of two sloping flats on either a generally cylindrical or possibly a conical enlargement on the piston member.

The valving element facing is round, has only the continuous peripheral bead 50h and is centrally apertured and flat backed to be received and be held in the body 50b as shown to provide a cylindrical face recess and a central projection through the facing aperture headed over at 50m for facing retention, as by ultra-sonic staking for a Zytel body; the bead 50h is even with or projects slightly beyond the body. In the facing with the limited contact area and smaller volume of elastomer stock therebeneath to be compressed for sealing, for a given elastomer the terminal motion of the push-button operation is achievable with less force exertion, and therefore the shut-off operation is more uniform and easier, than in the case of a solid face form. To increase and maintain the seal, water pressure against the inner periphery of the bead compresses the latter against the surrounding body wall to force the bead outward into firmer sealing contact with the area around the respective port.

To seal to the inside of the sleeve respectively below and above the level of the valving members 50, O-ring seals are disposed in circumferential grooves at 48 below the conical surface of cam enlargement 241c and thereabove at 45 on the upper part of the stem. The upward piston stem portion 241s of each barrel extends through a corresponding aperture in aforementioned shaft supporting plate stamping 238, serving also to retain the operating pistons as well as the control plugs 231h and 231c in their respective bores. Each piston has a vent passage 241v running from its bottom to top end to ensure easy operation and stable position retention for any selected volume setting.

At each of the diametrically opposed valving members 50 and also 90° therefrom at the location of discharge ports 220p, the sleeve has vertical slots intersecting external circumferential grooves thereby to define, between the sleeve and the surrounding bore wall, ample flow space; so that upon opening of either valve member 50 water can flow freely around the sleeve from the opened inlet port of the discharge passage or port 220p, and around each sleeve in passing through ports 220p from one barrel to another to reach the discharge outlet 220d. The discharge connection formation 220d in its laterally projecting disposition may be bored to receive piping entering from the bottom or latterally.

Figure 2:
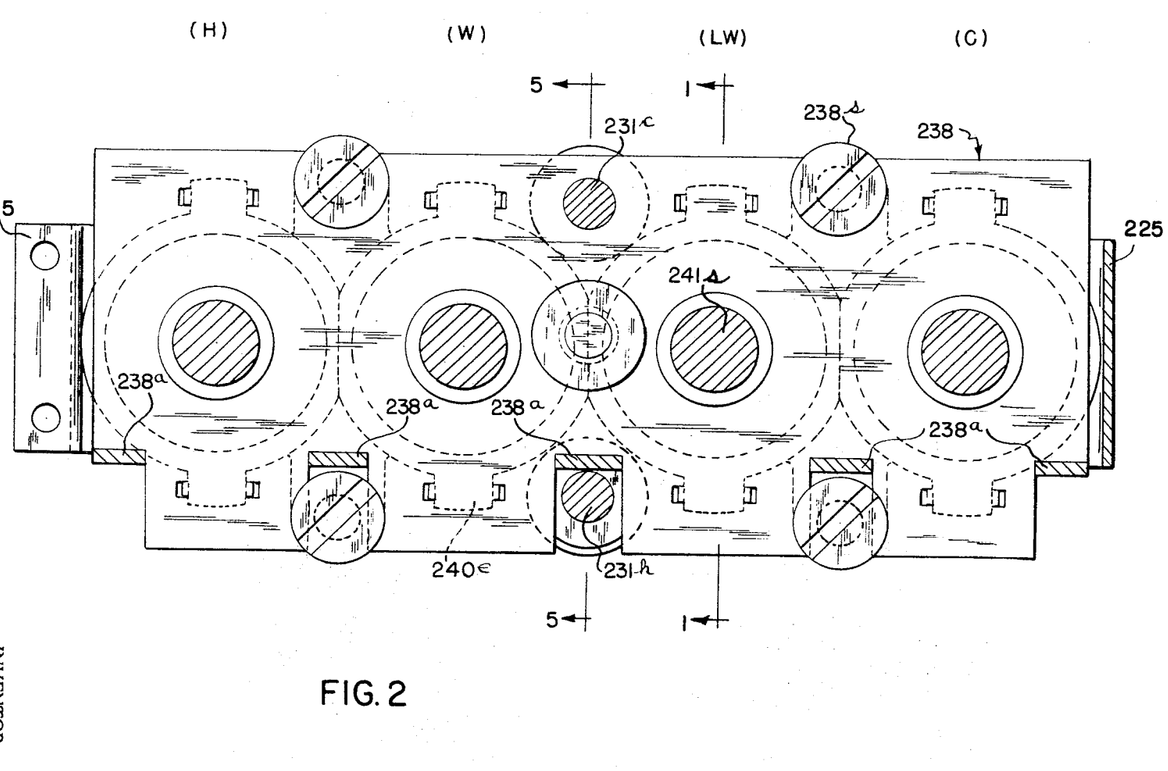
FIG. 2 is a top plan view of the valve with certain parts broken away above the level indicated by line 2—2 in FIG. 1.
Figure 4:
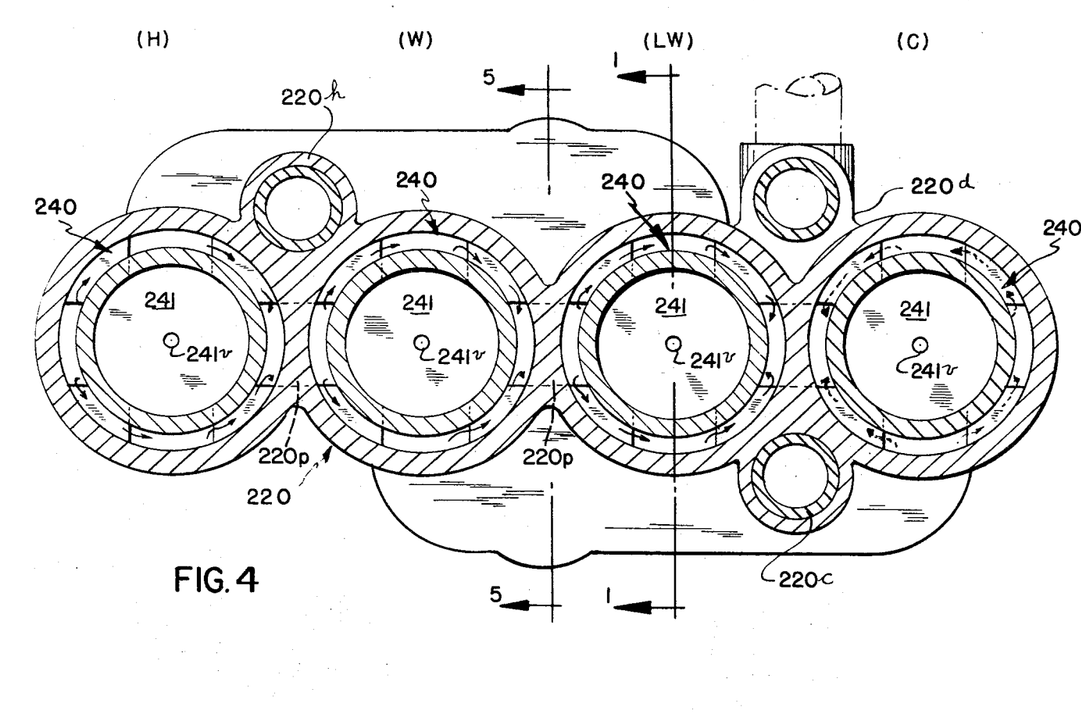

Along the bottom edge (as seen in FIG. 2) of the shaft supporting plate or stamping 238 (see FIGS. 1, 2, 5) five equispaced coplanar lugs 238a are upwardly struck and end-curled circularly into aligned top knuckles receiving the shaft 237 independently pivotally supporting four push-button rocker arms such as 221a. Each rocker arm has one leg slotted endwise with two right angle slots to receive respectively the flatted upper end of the piston stem and its pin 241p whereby rocker arm pivoting will raise and lower its piston. The other rocker arm leg is socketed for the tang of a detachable push-button element 221p, the tang and socket having interengaging means to hold them firmly assembled except upon deliberate detaching effort. In effect a two part pivoting push-button is provided having a pin-and-slot engagement with the respective piston. At its center region coplanar with the axes of the operating stems, the plate 238 is upwardly bossed and female threaded for securement, by screw 238t, of certain housing elements hereinafter to be described.

Figure 5:
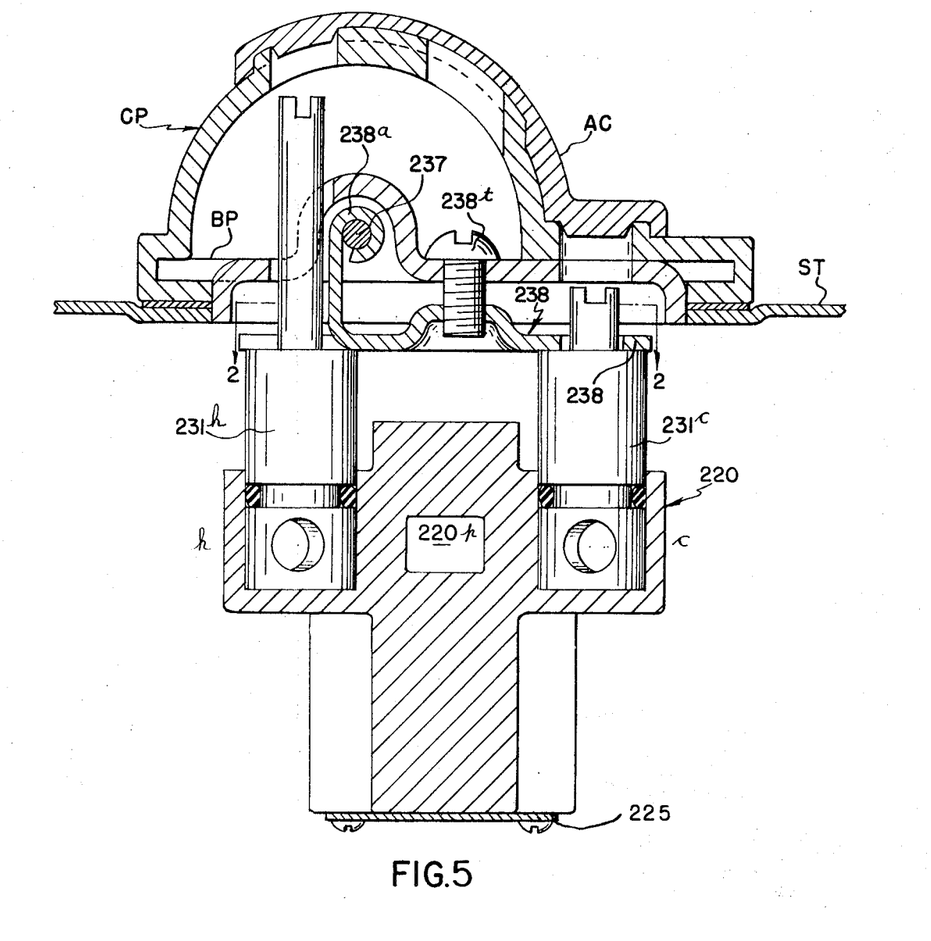
FIG. 5 is a vertical section at line 5—5 in FIG. 2.

In FIGS. 1 and 5 the valve is shown as mounted in a suitably sized rectangular opening of a sheet metal sink rim ST by a flat bottomed, broad U-shaped bracket strap 225 screw-secured to the valve body bottom and on its vertical legs provided with lateral oppositely projecting apertured flanges (shown only in FIG. 1) secured by screws to the sink top. FIG. 1A for horizontal mounting upon the sink top ST outlines a mounting and casting modification by provision of one intermediate anchor and two spacer ribs 225s and 225m parallel and integral on one body casting side, and a U-bolt 225u hooked through the anchor rib 225n passing through a sink aperture and bottommost clamp plate 225p for securement by nuts.

For the FIG. 1 type mounting, as a decorative top and rocker arm housing, formed of stamped sheet metal, or plastic and metal, a main decorative drawn cover CP having an elongated generally semi-cylindrical portion arching over the several operating elements therebeneath is permanently assembled by crimping its margins against and around the periphery of a second stamping as a base plate BP.

The base plate is provided with suitable apertures for the base-securing screw 238t, for the operating stems of 231h and 231c, and with an inverted trough-shaped formation accommodating the support arms 238a and shaft 237 and transversely slotted for the rocket arms 221; and edge lugs downwardly struck serve to orient the base, hence the assembly, in the sink top opening by engaging the opening edges as shown.

The cover portion CP is appropriately arcuately slotted for the tangs of the push-buttons 221p at each location of a rocker arm; and on each side of these slots is in effect upwardly flanged within dependent shrouding portions on the push-buttons 221p, effectively to prevent splashing of water into the valve rocker arm mechanism region. As the cover member CP has access apertures for access to the screw 238t and stems of plugs 231h and 231c, these apertures are provided with engaging formations for a removable snap-on arcuate cap AC completing the top enclosure.

With the push-buttons and snap-on cover AC removed this decorative top may accordingly be dropped over the upwardly projecting portions of the basic valve structure and, with an intervening gasket or sealing strip under the margins thereof, simply secured relative to the sink top and mounted valve by inserting the screw 238t manipulated through the aligned housing aperture to be threaded into 238. The push-buttons are then easily installed, any temperature settings of 231h and 231d made, and the cover AC snapped into place. Obviously subsequent adjustments of temperatures are readily made; and so also any internal servicing of valve members 50, all accessible from above the sink top by removal of screw 238t, the top assembly, and then screws 238s, freeing the plate 238 with rocker arms, and thus allowing withdrawal of one or more of the sleeves 240 with pistons 241 and members.

The continuous communication with ample flow space, between each bore and every other, provided by openings 220p and the vertically and circumferentially extended flow space about the sleeve 240 in each bore, allows wide choice in locating the discharge connection formation 220d otherwise than as shown, e.g., radially of any of the bores at various heights and directions, or downwardly at the casting wall portions between bores.

This, for example, permits 220d to be centrally downwardly disposed in alignment with the wall between the two intermediate bores and opening into both of the latter, either merely at the bottom or by enlarging the interbore opening 220p of that wall downwardly to the bottom of the bores; an advantageous position where it is desired also to locate the hot and cold connections in alignment with, and opening into the bores for, the temperature setting valve stems 231h and 231e, (with or without shut-offs) in order to use an above the sink mounting by a stamped bracket screw-secured, as is 225 but with spacing, to the casting bottom and having a large threaded nipple or mounting sleeve nut-secured through a sink top through which are carried the hot and cold supply and valve discharge tubing.

The manner of valve port closure and sealing, by a simple resilient facing pressing against a chamber wall in a compressed relation with the compressibility allowing variation in effective travel of 50, eliminates need of close finish dimensioning and machining of components. Thus the fabrication of the body 220 is simplified for low cost production both in the casting and in subsequent machining operations required; while most of the other principal operating components may be fabricated in final form as molded plastic elements; all readily assembled at a relatively low cost.

After the valve unit is installed, say on a sink top, and connected to the supply and discharge lines, before placement of the decorative cover AC, the "hot" and "cold" push-buttons are pushed forwardly, simultaneously or successively to run the hot and cold water lines until delivery of hot and cold water at normal operating temperatures, and shut off for similar adjusting operations of the luke-warm and warm delivery temperatures. The adjustments are simply effected by pressing the respective button, and setting the temperatures by rotation of the corresponding plug 231h or 231c, aided by appropriately positioned index marks on the plug and the body casting, until a desired delivery temperature is obtained. Then such cover as is desired to be used for the particular environment is screwed in place.

In use merely pressing the appropriate push-button forwardly will result in flow of the desired temperature, as soon, of course, as supply water of the contemplated supply temperatures is present at the valve. Pressing the H or C button, in progressively greater degree and shifting the respective cam from full closed position for a correspondingly greater cam recession from the controlled port allows the respective valve member 50 to be displaced further under supply pressure, giving greater flow in consequence of the increased flow area primarily between the valve member face and the mixing chamber wall surface, so that not only temperature but volume of discharge is selectable. Rearward returning finger pressure on the other face of a depressed push-button moderates or turns off flow.

The operation is similar upon depression or return of the buttons LW and W, except that motion of each affects the position of a corresponding pair of valve members 50 controlling two ports in each chamber for "luke-warm," and for "warm"; the water flowing from the ports mixing as it flows through the ample axial flow area provided between the body portions of the operators and sleeve 240 to the discharge passage 220p and outlet 220d.

From the drawing representations and the aforegoing description it is obvious that the unit may be inspected and serviced from one position with only a screw driver or even an appropriately sized coin, by merely removing such decorative cover as is used.

Figure 6:
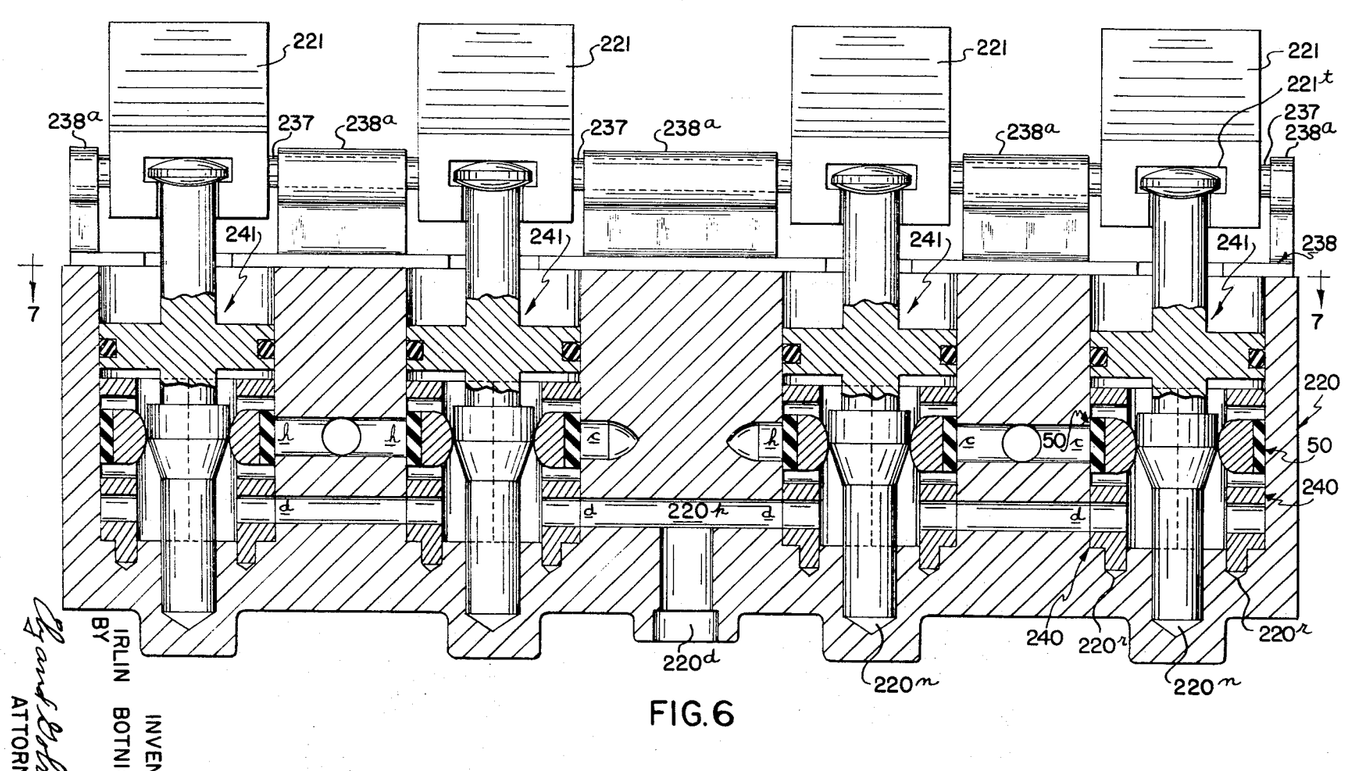
FIG. 6 is substantially a vertical longitudinal section showing another embodiment analogous to that of FIG. 1.
Figures 7, 8:
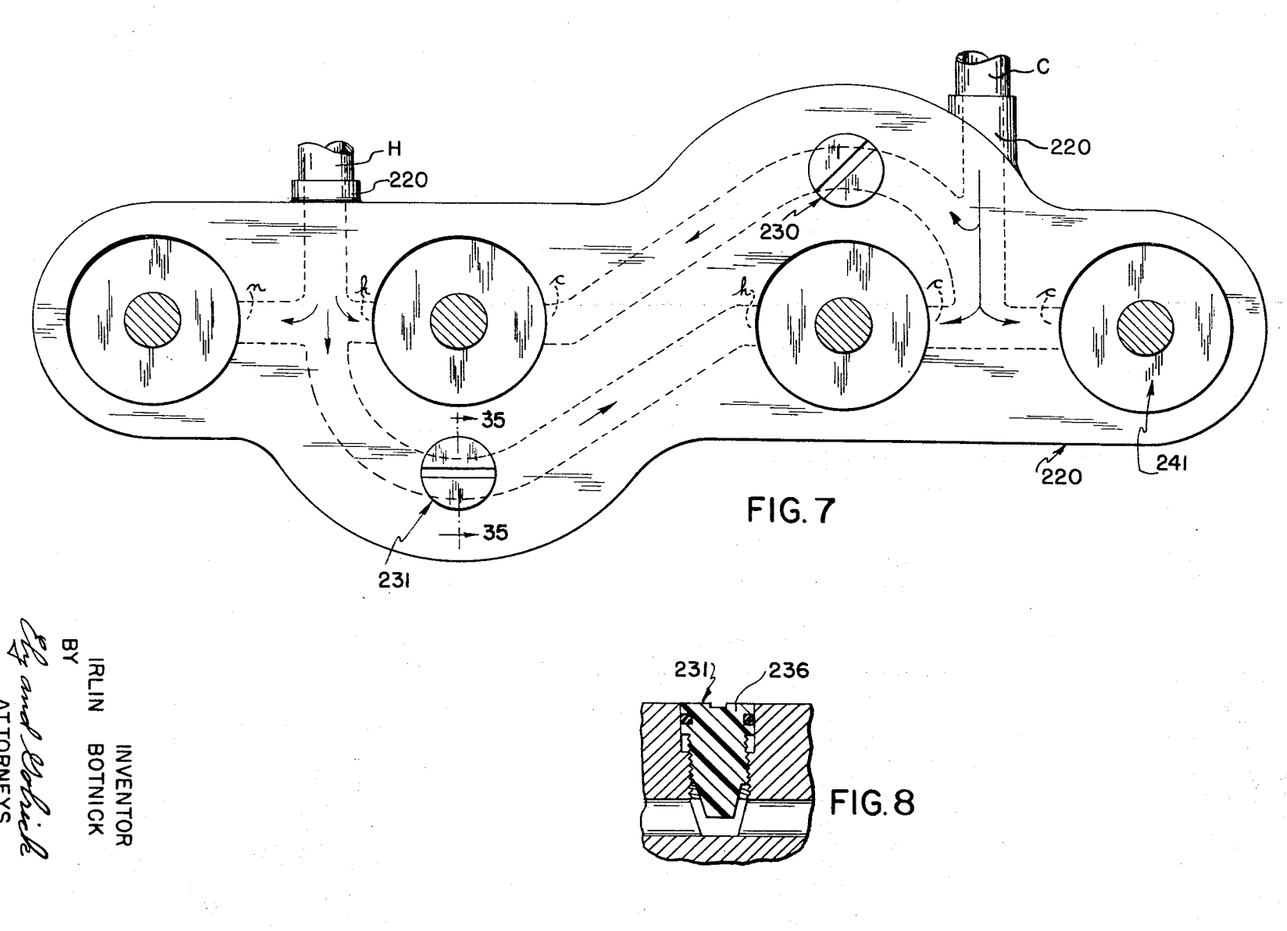
FIG. 7 is a horizontal section taken substantially at line 7—7 in FIG. 6.
FIG. 8 is a detail section taken at line 8—8 in FIG. 7.

FIGS. 6 and 7 show another form of mixing valve using axially shifting camming operators, again as in FIGS. 1-5 one per bore with one bore required in the body casting for each preset temperature to be available by push-button operation; four bores being shown for hot, cold, warm, luke-warm temperatures. Of course, here, as with the previously described plural push-button mixing valve not only is there obtainable a pre-set temperature for each of the push-buttons operated singly; but if it be desired, also any other temperature within the supply temperature range by operation simultaneously of more than one of the push-buttons to relative extents providing the temperature and flow desired.

In the body casting 220, the bores have respective bottom recesses, at 220n coaxial to pilot the inner ends of the respective identical stems 241 and 220 r to receive the locating pins of the valve member supporting frames 240 axially held by suitable means such as longitudinal screws threaded into the bore bottoms. All bores are intersected by a straight discharge passage 220p, resulting in bottommost radial discharge ports d all communicating with an outlet connection 220d through the bottom of an intervening center bore.

At a common higher level the bores have one or two radial inlet ports controlled by corresponding valve members 50, diametrically paired in sleeves 240, one member 50 being a dummy for balance of radial forces on the stems of the hot and cold bores, generally as in the valve of FIGS. 1-5. The branching of lateral hot water and cold water inlet passages from hot and cold supply connection 220h and 220c to the various barrels or bores through hot and cold water ports on a common centerline parallel to 220p, as shown in FIG. 7, is functionally the same as in FIG. 3. Also warm and luke warm temperature adjusting devices are located at 230, 231 comprising minor vertical threaded bores intersecting the respective arching supply branches to the intermediate bores into which are threaded O-ring sealed metering plugs 236, as shown in detail section in FIG. 8.

Since for all bores the port locations are identical, the sleeve frames 240, supporting like opposed members 50 can be identical. The valve members 50 are as previously described except as modified by the cam contact region back curvature. However, a composite sleeve may be used.

The structure of the valve operating reciprocating camming stems and general arrangement is apparent from the longitudinal section of FIG. 6.

Here the identical push-buttons, 221 all integral rocker arm forms, are again supported in a parallel side-by-side array, between spaced integral knuckles 238a, formed on and extending upward from the common base plate 238, by a knuckle-supported common pivot shaft 237. The base plate, again secured on the casting body by screws (not shown) across the bore openings, functions also as a closure-retainer for all the operator pistons, the stems of which project therethrough into an operating connection with their respective push-buttons; each by a stem head engaged in a bottom- and end-opening T-slot 221t in the lower push-button arm.

Accordingly when the inclined upward face of a push-button is depressed forwardly and downwardly, contrary to the action in FIG. 1, the stem is drawn out to turn on the water of desired temperature; but, as in FIG. 1, with volume increasing for increasing depression; the same being turned off by finger retracting backward pressure on the face of the T-slotted arm. The temperature selection of an intermediate bore is set by adjusting the screw needle valve or plug to throttle the flow in one of the inlet ports thereto similar in manner to the described setting for previous figures.

Figure 9A:
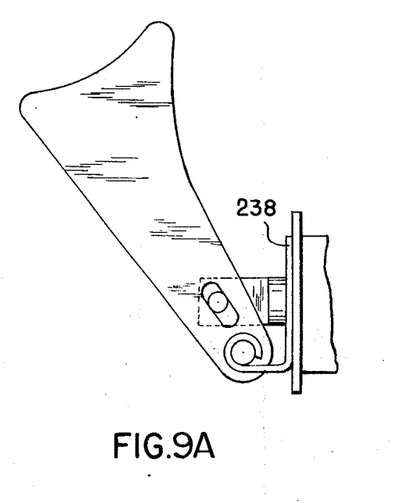
FIGS. 9A, 9B, 9C are modifications of stem manipulators.

In FIGS. 9A, B, C, are shown alternative forms of elements for the manual manipulation of reciprocable stems of a valve e.g., of a FIG. 1 or FIG. 6 type. FIGS. 9A and 9B again show essentially bifurcated levers to reciprocate a stem, self-evident as to structure and mode of operation.

Figure 9B:
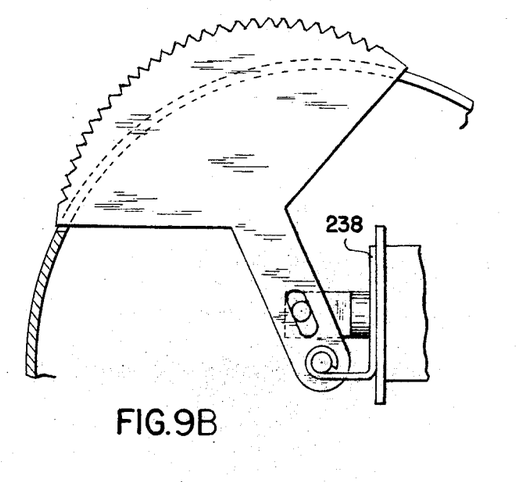

FIG. 9A presents merely an arm long enough to project from any valve cover used and be manually readily pushed or pulled to and fro; while FIG. 9B presents on the end of the lever a pressing area, merely an elongated concave face or as shown a fan-shaped sector enlargement which affords an arcuate serrated edge projecting from a corresponding slot of a valve cover having preferably the edge arc concentric with the lever pivot shaft, to present the appearance of a control wheel edge. The former stem moving element is especially adaptable for situations where it is desired to have the valve disposed with the stem axes disposed more or less horizontal rather than vertical; though the various other "push-button" systems may also be so disposed.

Obviously for self-closing action in public lavatory installations, each stem may be spring loaded toward closed position, either by a spring interposed between the stem bottom and the opposed fixed bottom surface therebeneath of the liner or of the casting, or by a spring surrounding the stem interposed between cover plate means such as 238 and say the lever arm or a pin through the stem; and e.g., in hospital installations, in conjunction with spring loading, a linkage such as a pull rod from a lever system similar to that in FIG. 9A downward to a respective foot pedal or threadle for each barrel may be used to provide foot operation. The reciprocable piston type valve construction also is adaptable to use with timed flow duration devices.

Figures 9C, 10:
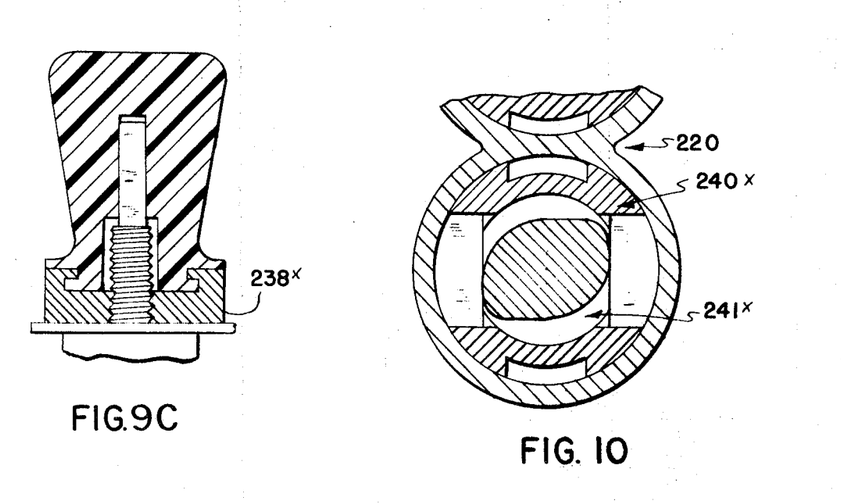
FIG. 10 represents a stem modification of FIG. 1.

In FIG. 9C the projecting valve stem portion is threadedly engaged with the retaining plate 238x and has a reduced top end of square or other non-round section slidably received in a corresponding shaped knob socket, the knob in turn having a grooved bottom portion engaged in retaining lips of plate 238x, so that upon rotation of the knob and corresponding rotation of the stem the latter is raised and lowered to effect valve member release from or camming toward closed positions. A knob of the general form of FIG. 9C but merely rigidly secured to the top of a stem and free of the plate 238, is a convenient element for operation of the rotary cam type stem hereinafter disclosed for FIG. 10.

A modification of the FIG. 1 valve wherein the stem in each bore or barrel is modified for rotational type actuation is indicated by the fragmentary section of FIG. 10, representing an upward sectional view taken as though at a level just below the location of the valving members 50. The body casting 220 and valve member support sleeve 240x are of the same forms as in FIG. 1; and generally so also the retention and sealing of the actuating stem member 241x to the surrounding structure, except that the cam formation has a shape as shown in FIG. 10 and that the element manually manipulated for flow control must be fixed on the stem top and assume a conveniently manually rotatable shape, such as that shown in FIG. 9C. It is seen that the cam shape is such that upon increasing stem rotation (counterclockwise in the figure) from the position shown, the valving members 50 may move inwardly for increasing flow, and vice versa.

I claim:

1. A valve structure for delivery from hot and cold supplies of respective selectively hot, cold and intermediate temperature water of at least one pre-determined temperature comprising:

a valve body having a main bore with a plurality of inlet ports opening into said bore through the cylindrical wall surface thereof, and parallel, to the said main bore thereof, two additional main bores, said valve body having     external hot and cold water supply connections, a discharge connection in communication with all said main bores, and respective sets of at least two inlet passages from each said supply connection,     each said set including a passage opening to an inlet port in the cylindrical wall of a respective one of said two additional main bores and a second passage opening to a respective inlet port of the first said main bore;

valving members for the respective said ports each with a resilient inlet port sealing front face, valving member supporting frame means in each bore insertable from one end of the bore, providing respective apertures in which the said members are movable toward and away from inlet closing sealing contact with the bore wall cylindrical surfaces, and shaped to provide flow space from said inlet ports to said discharge connection when said valving members are moved away from such sealing contact, valve operating stem means extending lengthwise into respective said bores, including stems movable between a full open and a full closed position and carrying cam means contacting the respective backs of said valving members and shaped to move the valve members radially to positions ranging from a maximum excursion from, and to a sealing contact with, the inlet port region of the bore wall, stem seal means movably sealing said stem means to the body; said frame means axially removable and insertable in and secured against shifting in the respective bores, and adjustable flow control means in said body for restricting flow in a said second passage from a respective one of the supply connections to the respective inlet port for establishing a mixed flow to the discharge connection for pre-selecting a said intermediate temperature, whereby the operation of said stems singly causes     discharge of water of a respectively different temperature and     a rate of discharge corresponding to the extent of stem operation between its full open and full closed positions.

2. A valve structure as described in claim 1 wherein each said stem is coaxially disposed and axially shiftable and said cam means includes an axially contoured cam formation.

3. A valving structure as described in claim 1, with each said frame means secured against rotation in, and insertable and removable from one end of, the bores; said apertures, of the frame means and said valving members including cooperating means releasably retaining the valving members in the frame.

4. A valving structure as described in claim 1 wherein each said valving member comprises a body element slideably engaging in said frame means, and as said resilient face, a resilient molded elastomeric element manually removably and insertably attached to said body element.

5. A valve structure as described in claim 1 including a further main bore and associated valving structure like to that associated with the first said bore;

each said set of passages including a third passage and said third passages opening to respective inlet ports of said further main bore.

6. A valve structure as described in claim 5, including a said adjustable flow control means restricting flow from the other one of said supply connections in the respective said third passage to the further main bore for pre-establishing a second said intermediate temperature.

7. A valve structure as described in claim 5 including respective rocker lever type push-buttons for respective stems, and means spanning the open ends of said main bores and pivotally mounting said push-buttons on the body, said stems extending through the last said means for engagement in respective push-buttons.

8. A valve structure as described in claim 1 including a further main bore and associated valving structure like to that associated with the first said bore;

each said set of passages including a third passage and said third passages opening to respective inlet ports of said further main bore.

9. A valve structure as described in claim 8, including a said adjustable flow control means restricting flow from the other one of said supply connections in the respective said third passage to the further main bore for pre-establishing a second said intermediate temperature.

10. A valve structure as described in claim 1 including a plate removably attached to said body across the bore openings for securing said frame means and retaining said stem means in respective bores;

and for each said stem, respective push-button actuated lever arm means pivotally mounted on said plate and having a pin and slot connection to the corresponding stem.

11. A valving structure for delivery from hot and cold supplies of respective selectively hot, cold and intermediate temperature water of at least one pre-determined temperature, comprising:

a valve body having a main bore with a plurality of inlet ports opening into said bore through the cylindrical interior wall surface thereof, the said valve body having, parallel to the said main bore thereof, two additional main bores, said valve body having     external hot and cold water supply connections, a discharge connection in communications with all said main bores, and respective sets of at least two inlet passages through the cylindrical bore walls from each said supply connection, each said set including a passage opening to an inlet port in a respective one of said two additional main bores and a second passage opening to a respective inlet port of the first said main bore, the inlet ports of the first said main bore diametrically disposed, valving members for the respective said ports each with a resilient inlet port sealing front face, valving member supporting frame means in each bore comprising a respective sleeve insertable from one end of the bore, said sleeves having apertures in which respective said members are movable toward and away from inlet closing sealing contact with the bore wall cylindrical surfaces, and shaped to provide flow space from said inlet ports to said discharge connection when said valving members are moved away from such sealing contact, said sleeve axially removable and insertable in and secured against shifting in the bores, valve operating stem means extending lengthwise into said bores movable between a full open and a full closed position and carrying cam means contacting the respective backs of said valving members and shaped to move the valve members radially to positions ranging from a maximum excursion from, and to a sealing contact with, the inlet port region of the bore wall, the respective valving members for the first said bore disposed in diametrically aligned slideways as the respective apertures in the respective sleeve, the said stem means for each such said main bore comprising a stem coaxially reciprocable in the bore and bearing a coaxially tapered formation, whereby cam means for the valve members of the said main bores are provided;

stem sealing means movably sealing said stems to the body comprising the respective said sleeve O-ring sealed to its bore and an O-ring seal of the stem to the inside surface of said sleeve;

each frame means of the two additional bores carrying two valving members, the first cooperating with a respective inlet port and the second serving as merely a reaction member engaging the respective stem means diametrically from the first; and also adjustable flow control means in said body for restricting flow in a said second passage from a respective one of the supply connection to the respective inlet port for establishing a mixed flow to the discharge connection for pre-selecting a said intermediate temperature, whereby the operation of said stems singly causes
 discharge of water of a respectively different temperature and
 a rate of discharge corresponding to the extent of stem operation between its full open and full closed positions.

12. A valving structure comprising:
a valve body having a main chamber with an open side, an inlet port opening into said chamber through a wall of the chamber, and a discharge port from the chamber,
a valving slide member,
an inlet port sealing element advanced in alignment with said inlet port by said slide member and having a front face adapted to make a sealing contact around the entire circumference of said inlet port on the interior surface of said chamber,
means between said slide member and front face resiliently compressible after said front face is brought into contact with the area peripheral to the inlet port,
a valving slide member supporting frame means in the chamber insertable from said open side, and having
 a bore opening at the open side of the chamber,
 an aperture formation radial to the bore forming a slideway for said slide member to move toward and away from inlet port closing position holding said front face in sealing contact with the chamber wall,
 and shaped relative to chamber wall portions to provide flow space from said inlet port to said discharge port when said valving member is moved away from such closing position, said slideway shaped to allow insertion and removal of the frame means with said valving slide member therein,
said slide member non-rotatable in the slideway,
a valve operating stem means extending into said bore reciprocable between a valve full open and a valve full closed position and carrying cam means contacting the back of said slide member shaped to move the slide member between a maximum excursion away from and a maximum approach to the inlet port region of the chamber wall and to intermediate positions dependent upon the stem position;
and means ultimately sealing said stem to the body.

13. A valve structure as described in claim 12 including at least two said inlet ports into the bore as a mixing chamber,
two said valving members in respective apertures in the frame means cooperating with the respective inlet ports,
said cam means on a single coaxial stem cooperating with both said valving members.

14. A valve structure as described in claim 13 having said inlet ports disposed diametrically to each other on said bore,
said stem coaxially disposed in and axially shiftable in said bore,
said cam means a coaxial cam formation on said stem comprising a cylindrical portion and a conical portion tapering from the cylindrical portion.

* * * * *